United States Patent
Krasner et al.

(10) Patent No.: US 11,243,829 B2
(45) Date of Patent: Feb. 8, 2022

(54) METADATA MANAGEMENT IN DATA STORAGE SYSTEMS

(71) Applicant: EMC IP Holding Company LLC, Hopkinton, MA (US)

(72) Inventors: John Krasner, Coventry, RI (US); Jason Duquette, Milford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/521,746

(22) Filed: Jul. 25, 2019

(65) Prior Publication Data

US 2021/0026717 A1  Jan. 28, 2021

(51) Int. Cl.
   *G06F 3/06* (2006.01)
   *G06F 11/07* (2006.01)
   *G06K 9/62* (2006.01)
   *G06F 16/16* (2019.01)

(52) U.S. Cl.
   CPC .......... *G06F 11/076* (2013.01); *G06F 3/0611* (2013.01); *G06F 3/0653* (2013.01); *G06F 3/0659* (2013.01); *G06F 3/0673* (2013.01); *G06F 16/164* (2019.01); *G06K 9/6256* (2013.01)

(58) Field of Classification Search
   CPC .... G06F 3/0611; G06F 3/0689; G06F 3/0643; G06F 16/172; G06F 16/164
   See application file for complete search history.

(56) References Cited

U.S. PATENT DOCUMENTS

| | | | |
|---|---|---|---|
| 2014/0258222 A1* | 9/2014 | Guo | G06F 16/172 707/610 |
| 2016/0321287 A1* | 11/2016 | Luthra | G06F 16/9574 |
| 2018/0364915 A1* | 12/2018 | Li | G06F 12/0871 |
| 2019/0073378 A1* | 3/2019 | Guturi | G06F 16/13 |

* cited by examiner

*Primary Examiner* — Edward J Dudek, Jr.
(74) *Attorney, Agent, or Firm* — Krishnendu Gupta; Nikhil Patel

(57) ABSTRACT

Embodiments of the present disclosure relate to an apparatus comprising a memory and at least one processor. The at least one processor is configured to: dynamically obtain a plurality of metadata from a global memory of a storage system; dynamically predict anticipated metadata based on the dynamically obtained metadata, wherein anticipated metadata is relevant to anticipated input/output (I/O) operations of the storage system; and dynamically instruct the storage system to load anticipated metadata into the global memory.

18 Claims, 7 Drawing Sheets

METADATA MANAGEMENT IN DATA STORAGE SYSTEMS

BACKGROUND

Metadata is information about information. It is a description of what a piece of data is about, when and how it was made, how it is connected to other information, etc. Metadata includes information to define data stored in a storage device or system. Metadata is also the information that is used for indexing and searching content in a search engine and it is an important component in big data analytics. It can be appreciated that fast access to metadata can lead to faster response in a storage system.

SUMMARY

An aspect of the present disclosure relates to dynamically obtaining a plurality of metadata from a global memory of a storage system. Anticipated metadata can be dynamically predicted based on the dynamically obtained metadata. The anticipated metadata is relevant to anticipated input/output (I/O) operations of the storage system. The storage system is dynamically instructed to load anticipated metadata into the global memory.

In embodiments, logical unit numbers ("LUNs") of the one or more storage devices that are active during an interval can be determined based on the dynamically obtained metadata; and LUNs of the one or more storage devices that will be active during one or more future intervals can be predicted based on the active LUNs during the interval.

In embodiments, a LUN map of the active LUNs from the one or more storage devices can be obtained during pre-determined periodic intervals; and the LUNs that will be active during the one or more future intervals can be predicted based on one or more active LUN maps.

In embodiments, the one or more active LUN maps can be ingested to predict the active LUNs during the one or more future intervals.

In embodiments, LUN tracks of each LUN of the one or more storage devices associated with metadata stored in one or more cache slots of the one or more storage devices that are active during an interval can be determined; and a set of LUN tracks for each of the LUNs of the one or more storage devices that are correlated can be determined. LUN tracks can be correlated when the LUN tracks are needed for I/O operations when each LUN track's corresponding LUN is active during the interval.

In embodiments, active track maps of the active LUN tracks of each LUN can be obtained during pre-determined periodic intervals; and the set of LUN tracks for each of the LUNs that are correlated can be determined using convolution processing layers.

In embodiments, the set of LUN tracks needed for I/O operations can be predicted during the one or more future intervals using a pattern of metadata present in the one or more cache slots of the one or more storage devices during a current interval.

In embodiments, an error score for the prediction of the set of LUN tracks needed for I/O operations can be generated during the one or more future intervals; and in response to determining the error score exceeds a threshold, and a training request can be issued to a classifier. The dynamically predicted anticipated metadata can be further based on error data used to generate the error score.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1A:
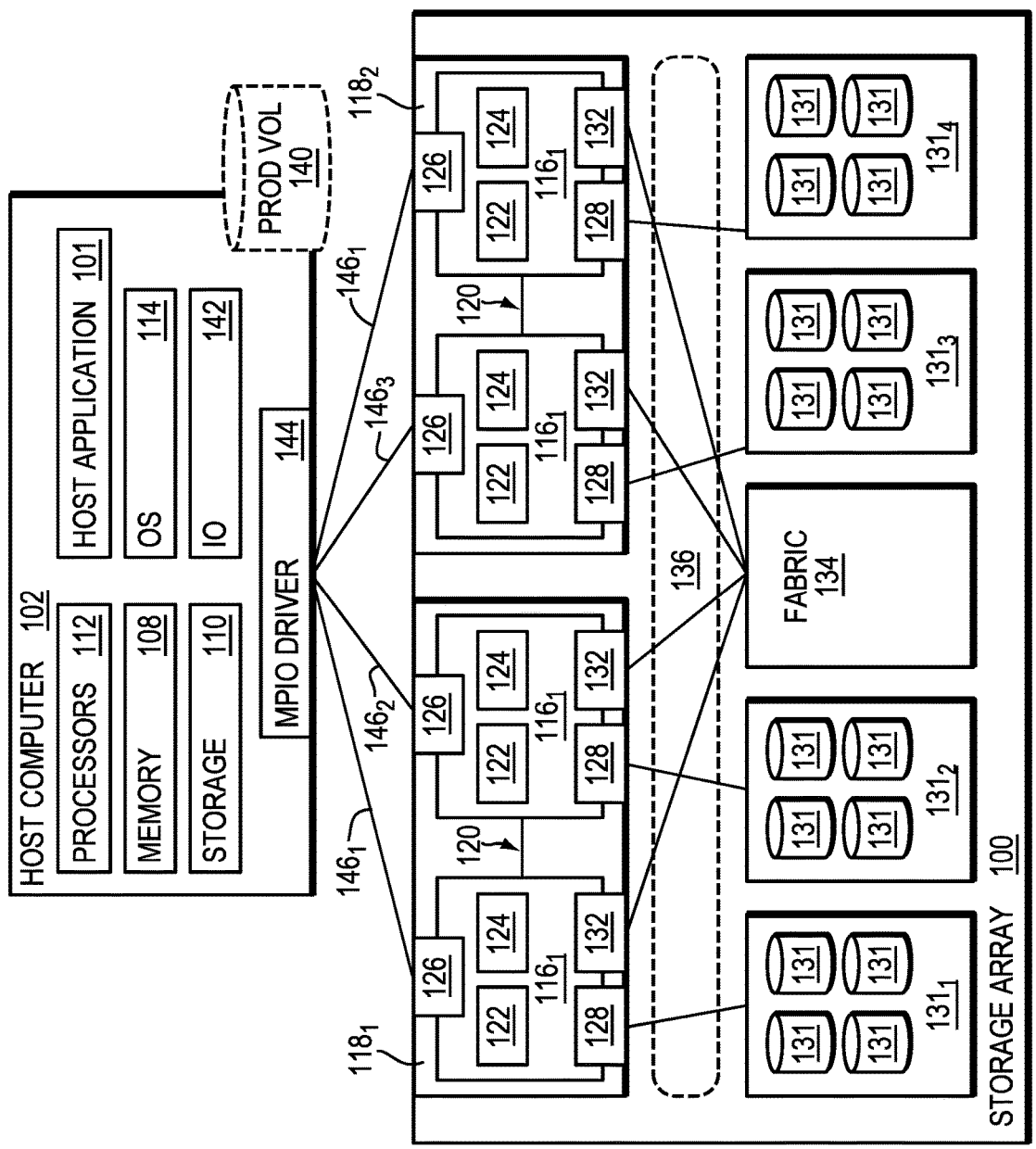
FIG. 1A is a block diagram of a storage array system deployed in a network environment according to example embodiments of the present disclosure.

Some aspects, features and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor devices. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible features. For example, a virtual storage device could be based on multiple physical storage drives. The term "logic" is used to refer to special purpose physical circuit elements and software instructions that are stored on a non-transitory computer-readable medium and implemented by multi-purpose tangible processors.

Metadata is generated for every track of storage in data storage systems. In embodiments, a track of storage is a defined size or chunk of data. The track of storage can be a size (i.e., optimized size) that an operating system can handle (i.e., perform operations on/with) efficiently. In embodiments, a track can be 128 k. For system performance, metadata is currently stored in physical random-access memory (RAM). Storage density and capacity are increasing at a faster rate than the availability of RAM in data storage systems because there are limitations on the amount of RAM that can be attached to a director board, and RAM density has not kept pace with the increases in storage density. In embodiments, a director board is a piece of hardware that includes a CPU complex, physical memory and a system interface board (SIB) that connects a director (e.g., as described in FIG. 1) to the matrix interface board enclosure (MIBE), and front and back end ports.

In addition, storage systems increasingly include new features that also increase the amount of metadata that must be maintained and managed. For example, hybrid cloud storage vastly increases the amount of data that can be accessed through local data storage systems. Hybrid cloud storage often relies on having metadata for the data tiered to cloud storage available to the local storage system in a manner that satisfies the performance requirements of the end user or application accessing the tiered data (i.e., by storing metadata in RAM). Accordingly, the increase in metadata stored within RAM can reduce an amount of RAM that can be devoted to track data caching, which can limit performance of data storage systems.

Embodiments of the present disclosure relate to one or more techniques for offloading metadata. For example, embodiments can include an offload device that comprises one or more processors and storage configured to store metadata records for a data storage system. The offload device can organize and prioritize the metadata in a manner as described herein to increase a probability of having relevant data available in the RAM of the data storage system for input/output (I/O) operations.

Figure 1B:
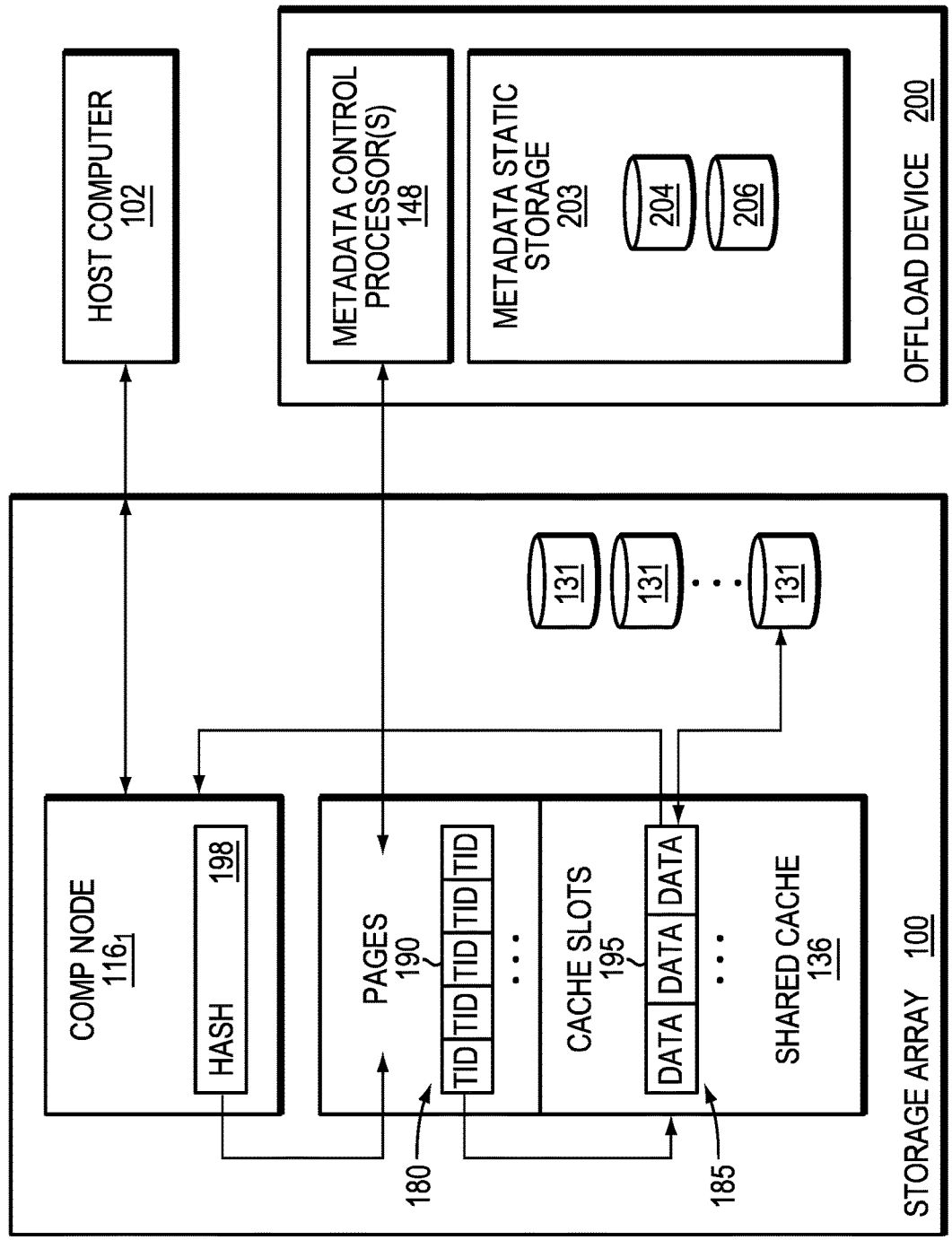
FIG. 1B is a block diagram of the storage array system of FIG. 1A coupled to an offload device according to example embodiments of the present disclosure.

Referring to FIG. 1, a storage array 100 maintains data for a host application 101 running on a host computer 102. In one embodiment, pages of associated metadata are maintained in a persistent (non-volatile) metadata static storage (e.g., static storage 203 of FIG. 1B). The host computer 102 may be a server with volatile memory 108, persistent storage 110, one or more tangible processors 112, and an OS (operating system) 114. The host computer 102 can support virtual hosts running on virtual machines or containers, and although an external host computer is illustrated, internal hosts may be instantiated within the storage array 100. The storage array 100 includes a plurality of computing nodes $116_1$-$116_4$. Pairs of the computing nodes, e.g. ($116_1$, $116_2$) and ($116_3$, $116_4$), may be organized as storage engines $118_1$, $118_2$, respectively, for purposes of failover. The paired computing nodes of each storage engine may be directly interconnected by communication links 120. Each computing node includes at least one tangible multi-core processor 122 and a local cache 124. The local cache 124 may include, for example and without limitation, volatile memory components such as RAM (random access memory). Each computing node may include one or more FEs 126 (front-end directors, a.k.a. front-end adapters) for communicating with the host computer 102. Each computing node $116_1$-$116_4$ may also include one or more BEs 128 (back end directors, a.k.a. back end adapters) for communicating with respective associated back end storage bays $130_1$-$130_4$, thereby enabling access to managed drives 131. The managed drives 131 may include tangible storage components of one or more technology types, for example and without limitation SSDs (solid state devices) such as flash and HDDs (hard disk drives), communicating over interfaces such as SATA (Serial Advanced Technology Attachment) and FC (Fiber Channel). Each computing node may also include one or more CAs (channel directors, a.k.a. channel adapters) 132 for communicating with other computing nodes via an interconnecting fabric 134. Each computing node may allocate a portion or partition of its respective local cache 124 to a virtual shared "global" cache 136 that can be accessed by other computing nodes, e.g. via DMA (direct memory access) or RDMA (remote direct memory access). Any number of host computers could be supported by the storage array, and any number of storage arrays could be included in the computer network. The host computer 102 may be connected to the storage array 100 via a communication network (not shown). The communication network may include various network nodes, e.g. switches, routers, hubs, and other network devices, and may include one or more of the Internet, a WAN (wide area network), MAN (metropolitan area network) and LAN (local area network).

The host application 101 uses storage services that are provided by the storage array 100. For example, the host application 101 may write host application data to the storage array 100 and read host application data from the storage array 100 to perform various host application functions. Examples of host applications may include but are not limited to file servers, block servers and databases. Multiple instances of a host application 101 may run on a host computer 102, and multiple host computers may be simultaneously supported by the storage array. The storage array 100 may include a wide variety of features for protecting against loss of host application data and assuring availability of host application data.

To provide storage services to host application 101, the computing nodes $116_1$-$116_4$ create and maintain a logical production volume 140 of storage for host application data. Without limitation, the production volume 140 may be referred to as a production device, production volume, production LUN or host LUN, where LUN (logical unit number) is a number used to identify the logical storage volume in accordance with, e.g., the SCSI (small computer system interface) protocol. The production volume 140 represents an abstraction layer between the managed drives 131 and the host application 101. From the perspective of the host application 101, the production volume 140 is a single data storage device having a set of contiguous fixed-size LBAs (logical block addresses) on which data used by the host application resides. However, the data used by the host application 101 may be maintained by the computing nodes $116_1$-$116_4$ at non-contiguous addresses on various managed drives 131.

To service IOs (input-output requests) from the host application 101, the storage array 100 maintains metadata that indicates, among various things, mappings between production volume 140 storage space and the locations of extents of host application data on the managed drives 131. In embodiments, an extent is a contiguous area of storage reserve for a file that can be represented as a range of block numbers. In response to an IO 142 from the host computer 102 to the production volume 140, the metadata is used to access the managed drives 131. An MPIO (multi-path input-output) driver 144 in the host computer 102 selects a path on which to send the IO to the storage array 100. There are multiple paths $146_1$-$146_4$ between the host computer 102 and the storage array 100, e.g. one path per FE 126. Each path may have a locally unique address that is known to the MPIO driver 144. However, the host application 101 is not aware of the paths and addresses because it views the production volume 140 as being available via a single logical path. The paths may be selected by the MPIO driver based on a wide variety of techniques and algorithms including, for context and without limitation, performance and load balancing. In the case of a read IO the storage array uses the metadata to locate the requested data, e.g. in the shared cache 136 or managed drives 131. If the requested data is not in the shared cache 136, then it is temporarily copied into the shared cache 136 from the managed drives 131 and sent to the host application via one of the computing nodes. In the case of a write IO the storage array 100 creates metadata that maps the production volume address with a location to which data is written on the managed drives 131. The shared cache 136 may enable the production volume 140 to be reachable via all the computing nodes and paths, although the storage array 100 can be configured to limit use of certain paths to certain production volumes.

Metadata is generated for every track of storage in data storage systems. For system performance, metadata is currently stored in physical random-access memory (RAM). Storage density and capacity are increasing at a faster rate than the availability of RAM in data storage systems because there are limitations on the amount of RAM that can be attached to a director board, and RAM density has not kept pace with the increases in storage density. Additionally, the increase in metadata reduces an amount of RAM that can be devoted to track data caching, which in turn limits performance of data storage systems. Consequently, there may be an advantage to maintaining only a portion of the metadata in the shared cache 136. This may be accomplished by maintaining metadata on an offload device (e.g., the offload device 200 of FIG. 1B) that comprises one or more processors and storage configured to store metadata records for the storage array 100. The offload device can organize the metadata between the shared cache 136 and storage of the offload device in a manner as described herein to increase a probability of having relevant metadata available in RAM for input/output (I/O) operations.

Referring to FIG. 1B, an offload device 200 is communicatively coupled to the storage array 100. The offload device 200 includes one or more metadata control processors 148 that control caching of metadata in an allocated portion of the shared cache 136 or storage of metadata in a metadata static storage 203 as discussed in greater detail herein. The metadata static storage can include 204, 206 SSDs, such as NAND flash memory.

Cached metadata may be in the allocated portion of the shared cache 136 and include TIDs (track ID tables) 180 that contain pointers to host application data 185 located in cache slots 195 in another portion of the shared cache 136 that is allocated for data. The TIDs may be maintained in fixed-size pages 190, e.g. and without limitation 4 KB, where each page holds multiple TIDs. A procedure for finding and utilizing a TID to satisfy an I/O received from the host computer varies depending on whether the TID is present in the shared cache 136. The computing node, e.g. computing node $116_1$, may identify corresponding TIDs by inputting the device number, cylinder number, head (track) and size obtained from the I/O 142 into a hash table 198. A wide variety of descriptive data structures could be used, of which hash table 198 is simply one example. The hash table 198 indicates the locations of TIDs in pages 190 in the shared cache 136. If there is an entry in the hash table 198 corresponding to the inputted information, then the TIDs are present in the shared cache 136. In other words, the TID is "IN," which is also known as a "cache hit." In the case of a cache hit the hash table 198 outputs a corresponding page number. The page number is used to locate the page that holds the TIDs in the shared cache 136. The TIDs are obtained from the shared cache 136 and used to find and retrieve the corresponding data from the cache slots 195. In the case of a Read I/O the data 185 may then be returned to the host computer 102. In the absence of a corresponding entry in the hash table 198, i.e., when the TID is "OUT," which is also known as a "cache miss," the hash table 198 outputs an indicator that there is no such page frame referenced in the hash table 198.

Figure 2:
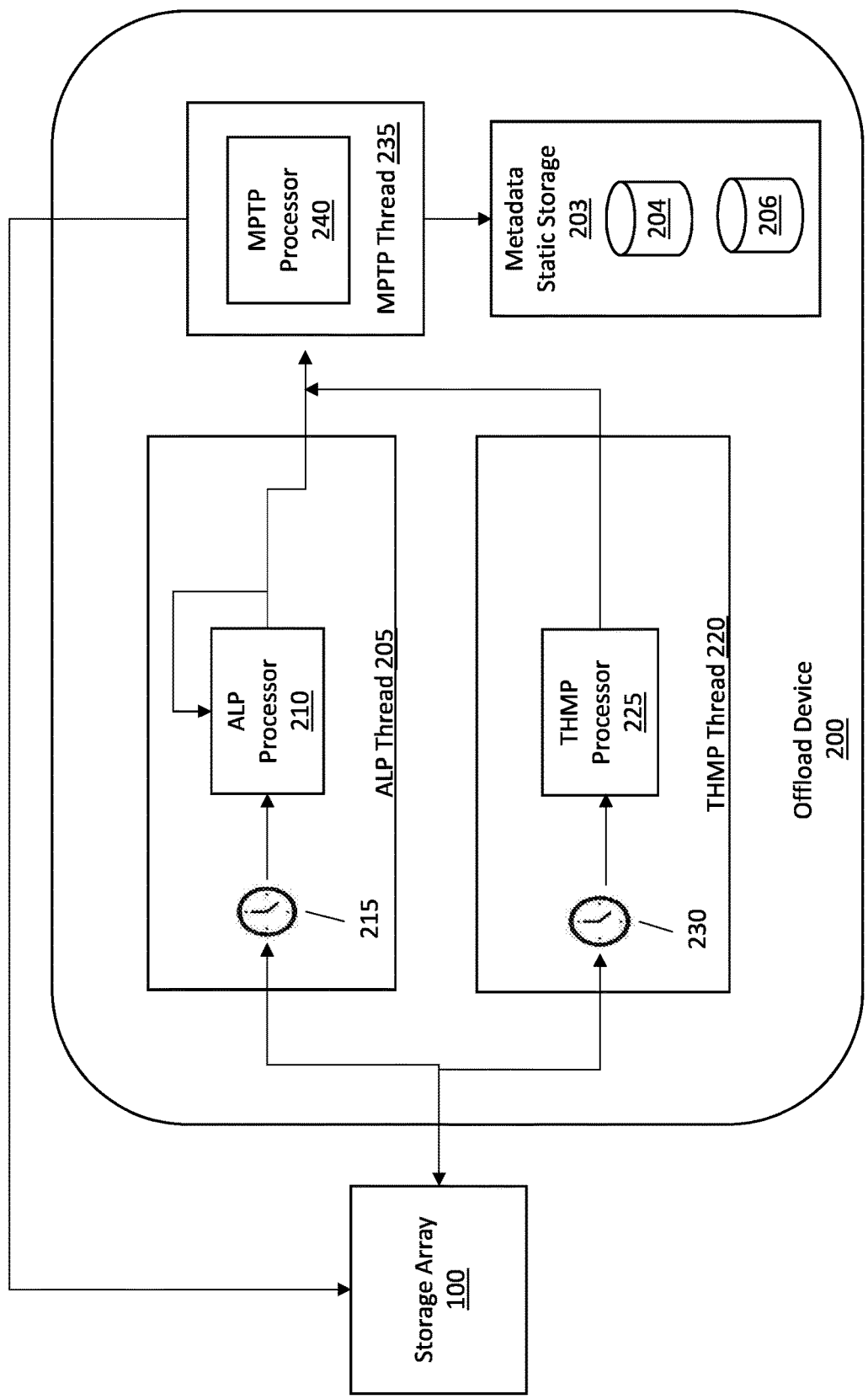
FIG. 2 is a block diagram of an offload device according to example embodiments of the present disclosure.

Referring to FIG. 2, an offload device 200 includes metadata control processors 148 (see FIG. 1B) and a metadata static storage 203. Generally, the offload device 200 is configured to offload computing tasks related to metadata management and storage such that RAM of the storage array 100 is freed for track data caching.

The metadata control processors 145 can have a parallel processing architecture substantially like, e.g., a Graphical Processing Unit (GPU). In such embodiments, the metadata control processors 145 include an active LUN prediction (ALP) processor 210, a track heat map prediction (THMP) processor 225, and a most probably tracks prediction (MPTP) processor 240. The processors 210, 225, 240 can be organized in parallel processing threads 205, 220, 235. In other embodiments, a general-purpose CPU or GPU can be configured as an ALP, THMP and/or MPTP processor.

An ALP thread 205 can include a ALP timer 215 that is configured to determine all active LUNs corresponding to a storage array (e.g., the storage array 100 of FIG. 1B) during an ALP interval. In embodiments, the ALP interval timer 215 can be set to make the determination during pre-determined periodic or dynamically determined units of time. In embodiments, the ALP timer 215 can include a microcontroller and an atomic clock, quartz crystal oscillator, quantum clock, or any other known to be known clock configured for precise time-keeping. For example, the ALP timer 215 is an interval-based timing scheduler by which all execution threads are processed based on the associated time intervals that a user and/or application sets. The ALP timer 215 can provide the determination of the active LUNs to the APL processor 210. The ALP processor 210 can be configured to use the active LUNs to predict and output a map of all LUNs that are expected to be active in a next ALP interval (e.g., unit of time). In embodiments, the ALP processor 210 can have a recurrent neural network (RNN) machine learning architecture to make the prediction based on previous predictions and current active LUN inputs. For example, the ALP processor 210 can add each prediction to previous predictions and/or each input of active LUNs during any given ALP interval to train a classifier. As such, the ALP processor 210 can compare its predictions with actual data using the RNN architecture to continually improve its predictions over time. The ALP processor 210 can provide the map of the expected active LUNs during a future internal to the MPTP processing thread 220.

Contemporaneous to the ALP thread 205, the THMP thread 220, using a THMP timer 230, can determine LUN tracks of each LUN associated with metadata stored in cache slots (e.g., slots 195 of FIG. 1B) of the storage array 100 that are active during a THMP interval. In embodiments, the THMP timer 230 can include a microcontroller and an atomic clock, quartz crystal oscillator, quantum clock, or any other known to be known clock configured for precise time-keeping. In embodiments, the THMP interval may or may not be synchronized with the ALP interval. The THMP timer 230 can provide the active LUN tracks to the THMP processor 225. In embodiments, the THMP timer 230 can label each active LUN track map by the LUN that the tracks of them map belong to. The THMP processor 225 can be configured to receive the active LUN tracks during the THMP interval and determine a set of tracks for each LUN that are the most correlated. In embodiments, the THMP processor 225 can have a deep learning convolution neural net architecture to determine which set of tracks for each LUN are the most correlated. For example, the deep learning convolution neural net architecture can include one or more convolution processing layers. In example embodiments, the THMP processor 225 determines LUN tracks are correlated based on the LUN tracks needed for I/O operations when each LUN track's corresponding LUN is active during the THMP interval.

The MPTP thread 235 can receive the active LUNs during the ALP interval and the correlated LUN tracks during the ALP interval. Contemporaneously, the MPTP processor 240 can obtain a pattern of metadata present in the cache 195 during a current interval. Using the inputs from the ALP processor 210 and the THMP processor 225 and the pattern of metadata, the MPTP processor 240 can predict a set of LUN tracks needed for I/O operations during one or more future intervals. In embodiments, the MPTP processor 240 produces an error predictor using machine learning techniques. The error predictor can be a high or low error prediction based on predetermined criteria (e.g., criteria defining acceptable margins of error), amount of data, and type of data that is fed into a LUN prediction model to be processed. Based on the error predictor, the MPTP processor 240 can adjustment the LUN prediction model to minimize high errors.

Based on the predicted set of LUN tracks needed for I/O operations during the one or more future intervals, the MPTP processor 240 can ensure that the metadata corresponding to the set of LUN tracks needed for the one or more future intervals is stored in the cache slots 195. For example, the MPTP processor 240 may not need to perform any actions of all relevant metadata is already located in the cache slots 195. In scenarios where metadata needed for the one or more future intervals is stored in the metadata static storage, the metadata static storage can add the metadata to the cache slots 195 or swaps metadata data between the cache slots 195 and the metadata static storage 203 based on an availability of slots of the cache slots 195.

In embodiments, the MPTP processor 240 can maintain an error score for each prediction. For example, the MPTP processor 240 can compare its prediction of needed LUN tracks with actual LUN tracks needed during the one or more future intervals. The error score can be a function of the hits versus misses. The error score takes into account current LUNs and LUN tracking, adds in a historical depiction of past LUNs and LUN tracks. Accordingly, depending on what matches (i.e., results of the prediction comparison), or in this case what does not match, the error score is generated and associated with the metadata. In embodiments, if the error score exceeds a predetermined threshold, the MPTP processor 240 can issue a signal to the THMP processor 225 and/or the ALP processor 210 to enter a retraining mode.

FIGS. 3-6 illustrate methods and/or flow diagrams in accordance with this disclosure. For simplicity of explanation, each method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter.

Figure 3:
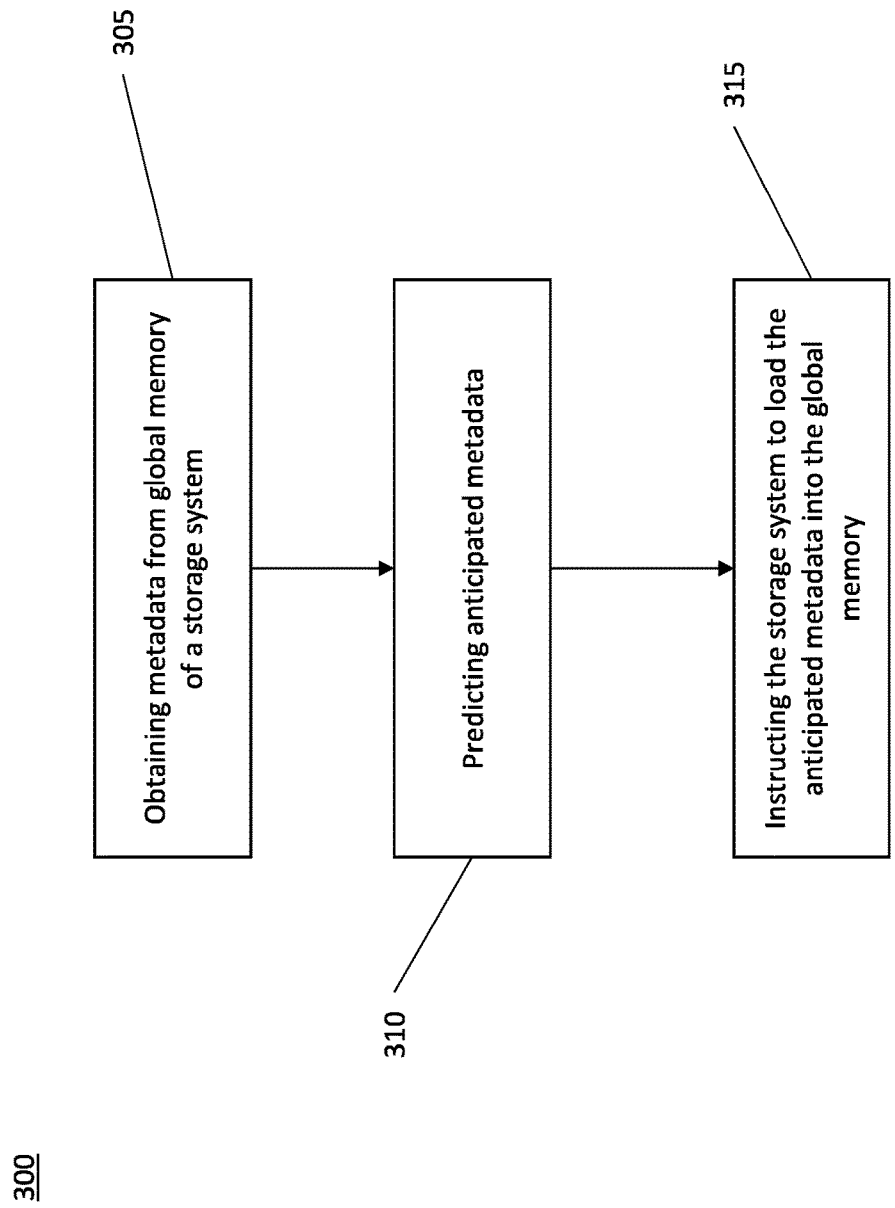
FIG. 3 is a flow diagram of a method for metadata management in a data storage system according to example embodiments of the present disclosure.

Referring to FIG. 3, a method 300 includes, at 305, dynamically obtaining, e.g., by the offload device 200 of FIG. 2 metadata from a global memory (e.g., shared cache 136 of FIG. 1B) of a storage system (e.g., storage array 100 of FIG. 1B). At 310, the method 300 can also include dynamically predicting, e.g., the offload device 200, anticipated metadata based on the dynamically obtained metadata. The metadata is anticipated in that the offload device determines that the metadata is predicted to be relevant and/or related to anticipated input/output (I/O) operations of a storage array (e.g., the storage array 100 of FIG. 1B). The method 300, at 315, can further include dynamically instructing, e.g., by the offload device 200, the storage array 100 to load the anticipated metadata into the global memory.

Figure 4:
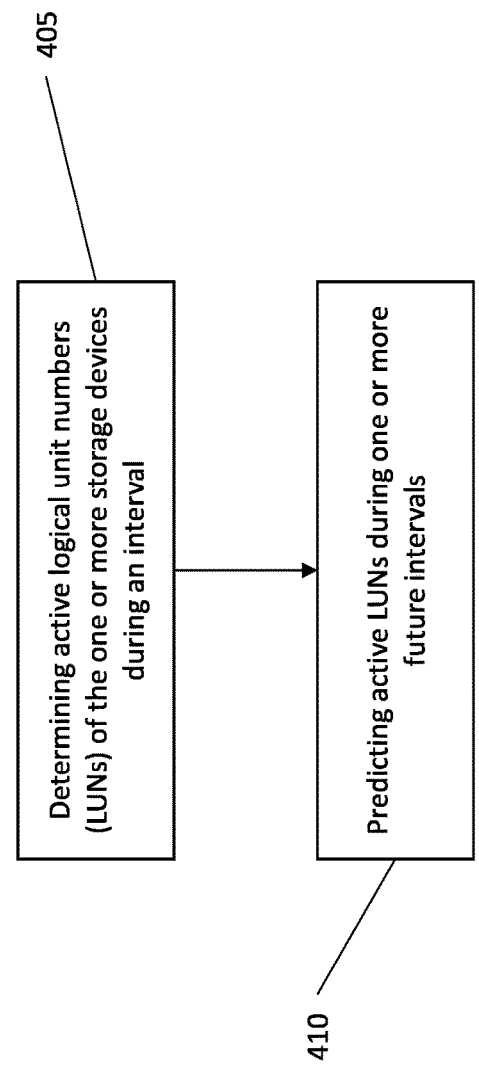
FIG. 4 is a flow diagram of a method for predicting active logical unit numbers (LUNs) of a storage system during a subject processing interval according to example embodiments of the present disclosure.

Referring to FIG. 4, step 310 of method 300 can include the processing steps of method 400. Method 400, at 405, can include determining LUNs the storage array 100 that are active during an interval based on the dynamically obtained metadata. The interval can be a period unit of time that is either predetermined or dynamically determined by the offload device 200. The method 400, at 410, can further include predicting LUNs of the storage array 100 that will be active during one or more future intervals based on the active LUNs during the interval. For example, the offload device 200 can predict LUNs that are likely to be active during a future unit of time based on those active LUNs of current and previous units of time.

Figure 5:
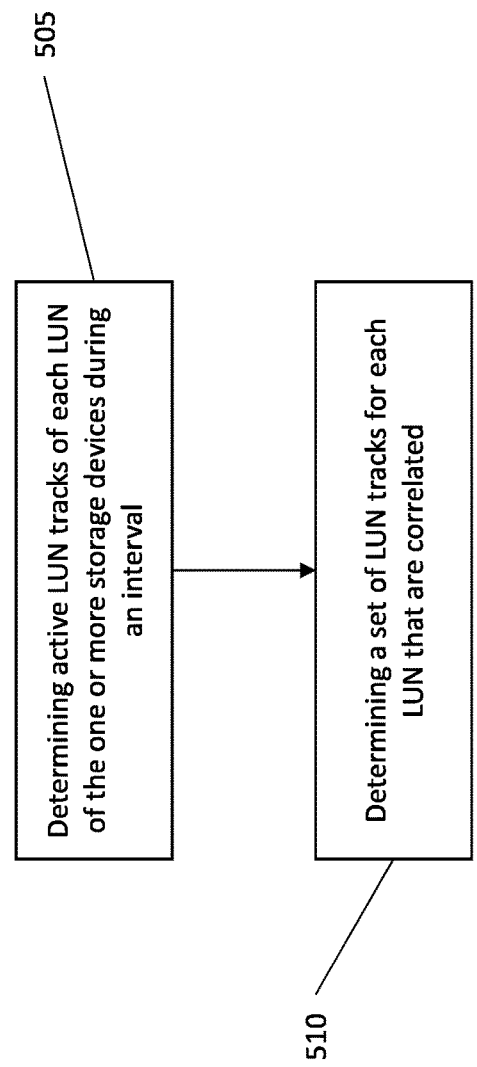
FIG. 5 is a flow diagram of a method for determining active tracks for each LUN of a storage system according to example embodiments of the present disclosure.

Referring to FIG. 5, step 310 of method 300 can further include the processing steps of method 500. Method 500 can include, at 505, determining LUN tracks of each LUN of the storage array 100 associated with metadata stored in one or more cache slots 195 of the storage array 100 that are active during an interval. Further, the method 500, at 510, can include determining a set of LUN tracks for each of the LUNs of the storage array 100 that are correlated. In embodiments, LUN tracks are correlated when the LUN tracks are needed for I/O operations when each LUN track's corresponding LUN is active during the interval.

Figure 6:
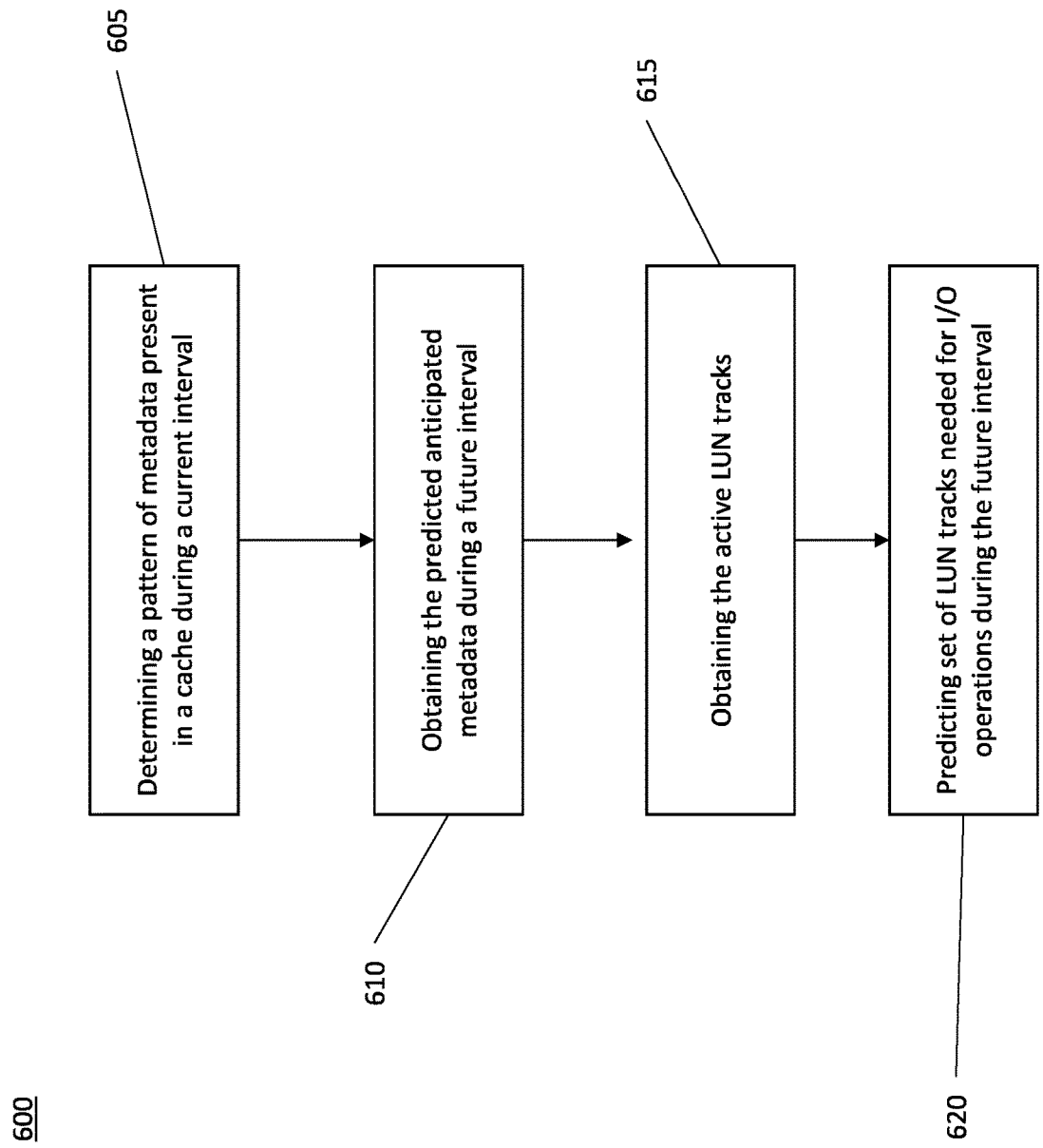
FIG. 6 is a flow diagram of a method for predicting active tracks for each LUN of a storage system during a subject processing interval according to example embodiments of the present disclosure.

Referring to FIG. 6, step 310 of method 300 can also include the processing steps of method 600. Method 600, at 605, can include determining a pattern of metadata present in the cache slots 195 of the storage array 100 during a current interval. At 610, the method 600 can include obtaining the predicted anticipated metadata during the future interval (e.g., from the prediction of step 410 of method 400). The method 600, at 615, can further include obtaining the active LUN tracks determined from step 505 of method 500. At 620, the method 600 can include predicting the set of LUN tracks needed for I/O operations during the one or more future intervals using the information determined and/or obtained information from steps 605, 610, and 615.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the concepts described herein by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random-access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the concepts described herein may be embodied in other specific forms without departing from the spirit or essential characteristics thereof. The foregoing embodiments are therefore to be considered in all respects illustrative rather than limiting of the concepts described herein. Scope of the concepts is thus indicated by the appended claims, rather than by the foregoing description, and all changes that come within the meaning and range of equivalency of the claims are therefore intended to be embraced therein.

What is claimed is:

1. An apparatus comprising a memory and at least one processor configured to:
   dynamically obtain a plurality of metadata from a global memory of a storage system;
   dynamically predict anticipated metadata based on the dynamically obtained metadata, wherein anticipated metadata is relevant to anticipated input/output (I/O) operations of the storage system; and
   dynamically predict anticipated metadata based on the dynamically obtained metadata, wherein anticipated metadata is relevant to anticipated input/output (I/O) operations of the storage system;
   dynamically maintain and organize the plurality of metadata between the global memory and storage of an offload device based on the predicted anticipated metadata;
   obtain a LUN map of one or more active LUNs during pre-determined periodic intervals; and
   predict the LUNs that will be active during one or more future intervals based on the LUN map.

2. The apparatus of claim 1, wherein each of the plurality of metadata includes one or more of the following information: a tag, allocation timer, holder, and lock.

3. The apparatus of claim 1 further configured to:
determine logical unit numbers ("LUNs") of the one or more storage devices that are active during an interval based on the dynamically obtained metadata; and
predict LUNs of the one or more storage devices that will be active during one or more future intervals based on the active LUNs during the interval.

4. The apparatus of claim 1 further configured to ingest the one or more active LUN maps to predict the active LUNs during the one or more future intervals.

5. The apparatus of claim 3 further configured to:
determine LUN tracks of each LUN of the one or more storage devices associated with metadata stored in one or more cache slots of the one or more storage devices that are active during an interval; and
determine a set of LUN tracks for each of the LUNs of the one or more storage devices that are correlated, wherein LUN tracks are correlated when the LUN tracks are needed for I/O operations when each LUN track's corresponding LUN is active during the interval.

6. The apparatus of claim 5 further configured to:
obtain active track maps of the active LUN tracks of each LUN during pre-determined periodic intervals; and
determine the set of LUN tracks for each of the LUNs that are correlated using convolution processing layers.

7. The apparatus of claim 6 further configured to predict a set of LUN tracks needed for I/O operations during the one or more future intervals using the prediction of the active LUNs and the determined set of correlated LUN tracks.

8. The apparatus of claim 7 further configured to predict the set of LUN tracks needed for I/O operations during the one or more future intervals using a pattern of metadata present in the one or more cache slots of the one or more storage devices during a current interval.

9. The apparatus of claim 7 further configured to:
generate an error score for the prediction of the set of LUN tracks needed for I/O operations during the one or more future intervals; and
in response to determining the error score exceeds a threshold, issue a training request to a classifier, wherein the dynamically predicted anticipated metadata is further based on error data used to generate the error score.

10. A method comprising:
dynamically obtaining a plurality of metadata from a global memory of a storage system;
dynamically predicting anticipated metadata based on the dynamically obtained metadata, wherein anticipated metadata is relevant to anticipated input/output (I/O) operations of the storage system;
dynamically maintaining and organizing the plurality of metadata between the global memory and storage of an offload device based on the predicted anticipated metadata;
obtaining a LUN map of one or more active LUNs during pre-determined periodic intervals; and
predicting the LUNs that will be active during one or more future intervals based on the LUN map.

11. The method of claim 10, wherein each of the plurality of metadata includes one or more of the following information: a tag, allocation timer, holder, and lock.

12. The method of claim 10 further comprising:
determining logical unit numbers ("LUNs") of the one or more storage devices that are active during an interval based on the dynamically obtained metadata; and
predicting LUNs of the one or more storage devices that will be active during one or more future intervals based on the active LUNs during the interval.

13. The method of claim 10 further comprising ingesting the one or more active LUN maps to predict the active LUNs during the one or more future intervals.

14. The method of claim 12 further comprising:
determining LUN tracks of each LUN of the one or more storage devices associated with metadata stored in one or more cache slots of the one or more storage devices that are active during an interval; and
determining a set of LUN tracks for each of the LUNs of the one or more storage devices that are correlated, wherein LUN tracks are correlated when the LUN tracks are needed for I/O operations when each LUN track's corresponding LUN is active during the interval.

15. The method of claim 14 further comprising:
obtaining active track maps of the active LUN tracks of each LUN during pre-determined periodic intervals; and
determining the set of LUN tracks for each of the LUNs that are correlated using convolution processing layers.

16. The method of claim 15 further comprising predicting a set of LUN tracks needed for I/O operations during the one or more future intervals using the prediction of the active LUNs and the determined set of correlated LUN tracks.

17. The method of claim 16 further comprising predicting the set of LUN tracks needed for I/O operations during the one or more future intervals using a pattern of metadata present in the one or more cache slots of the one or more storage devices during a current interval.

18. The method of claim 16 further comprising:
generating an error score for the prediction of the set of LUN tracks needed for I/O operations during the one or more future intervals; and
in response to determining the error score exceeds a threshold, issuing a training request to a classifier, wherein the dynamically predicted anticipated metadata is further based on error data used to generate the error score.

* * * * *